Patented Mar. 11, 1952

2,588,337

UNITED STATES PATENT OFFICE 2,588,337

CONCENTRATION OF ORANGE JUICE

George Sperti, Cincinnati, Ohio, assignor to The Institutum Divi Thomae Foundation, Cincinnati, Ohio, a corporation of Ohio not for profit No Drawing. Application April 17, 1950, Serial No. 156,495

9 Claims. (Cl. 99—205)

This invention relates to the production of frozen orange juice concentrates adapted to be reconstituted for beverage purposes by the addition of water.

Orange juice concentrates of the type characterized above have enjoyed rapidly increasing popularity and have gone into widespread use within the past few years. For most purposes a four-fold concentration (with respect to Brix values) is employed, the concentrate being reconstituted by adding three parts of water. Thus a concentrate of 40-43 Brix reconstitutes to a juice of 11-12 Brix which is about right for beverage purposes. The concentrate, however prepared, is usually sealed in cans and held in frozen storage until sold to the consumer, and the container can be used as a convenient measure of the amount of water reconstitution.

Generally speaking, two methods of preparing such concentrates have been used. In one of these methods, the fresh juice is subjected to evaporation under vacuum at relatively low temperatures to minimize the adverse effect of heat on the taste of the concentrate and of the reconstituted beverage. However, this process has the well known defects that some "cooked" taste is unavoidable, and especially that the volatile true fruit flavor constituents of the fresh juice are almost totally lost during vacuum evaporation. In an effort to overcome these drawbacks, a common practice has been to overconcentrate the juice under vacuum to six or seven-fold concentration, and then to dilute the concentrate back to about four-fold concentration by the addition of fresh juice (see U. S. patent to McDowell et al. No. 2,453,109). Some fresh flavor is thereby restored to the concentrate, but the amount of "cut-back" fresh juice that can be added without diluting the concentrate beyond the desired point is too small to provide the desired level of flavor in the reconstituted beverage.

A second method of preparing such concentrates comprises concentrating the fresh juice by freezing and then separating the resulting concentrate from the ice, usually by centrifuging although other methods such as drainage under suction can be used. This method has the advantages that all adverse effects of heat on the taste of the concentrate are eliminated, and that loss of volatile flavor constituents such as occurs during vacuum evaporation is avoided, since practically all volatile constituents are recovered in the concentrate. However, when this process is operated to produce concentrations as high as four-fold, the efficiency in terms of sugar recovery is low due to the fact that large amounts of soluble solids (mostly sugars) are occluded in the ice and cannot be recovered without reprocessing the ice. On the other hand, when the ice is frozen only hard enough to produce about three-fold concentration, and with proper control of the conditions of freezing the juice and handling and centrifuging the ice, a product of high quality can be obtained with an efficiency of 85-90 in terms of recovery of soluble solids, but this product must be merchandised under the handicap of higher cost of cans, refrigeration and transportation per volume of reconstituted beverage as compared with four-fold concentrates. Furthermore, the sugars remaining in the ice represent an economic loss, unless the ice is reprocessed at additional cost.

The present invention preserves the advantages of freezing concentration with respect to retention of volatile flavor and elimination of cooked taste, and at the same time eliminates losses of soluble solids (i. e., sugars) in the ice and provides a four-fold or even greater degree of concentration.

Broadly speaking, processes embodying the present invention comprise first the concentration of the fresh juice by freezing and separation of the resulting concentrate therefrom, preferably by centrifuging the frozen juice mass. This concentrate contains a substantial part of the sugars of the fresh juice, and also practically all of its volatile flavor constituents because it has been found that these constituents are concentrated in the initial discharge from the centrifuge and hence are practically completely recovered although substantial amounts of sugars and pulp still remain in the residue ice.

The residue ice is then thawed at least enough to release substantially all of the occluded sugars and pulp in a liquid solution-suspension that is practically devoid of volatile flavor constituents. Since the sugars and pulp are not heat-labile, this liquor is concentrated by evaporation, preferably under vacuum at low temperatures, without objectionable deterioration of taste and flavor. After most of the water has been removed, the concentrated liquor is returned to and mixed with the centrifuged concentrate so that the mixture contains practically all of the valuable constituents of the fresh juice without material loss or deterioration of volatile flavor. If the ice is completely thawed and evaporated, the recovery of soluble solids will be practically 100%. To decrease the evaporation load, however, it may be preferred to thaw the ice only partially and then to discard the remaining ice even though it still contains a few per cent of the original soluble solids.

The process is adapted for continuous operation, the fresh juice being passed through a continuous freezer and into a continuous centrifuge in which the concentrate is separated from the ice, and the latter being discharged from the centrifuge, thawed either partially or entirely, and the resulting liquor passed through evaporating apparatus and back to the centrifuged concentrate. For smaller scale operations, however, batch procedures can be employed as described in detail hereinafter, the conditions set forth hereinafter applying equally to both cases.

Since the centrifuged concentrate is incorporated in the final product without further processing, all of its water must be taken into account with respect to the Brix value of the final product. In other words, the freezing and centrifuging operations must be correlated with the Brix of the starting juice and with the Brix value desired in the final product. The Brix of the fresh juice will usually run about 12, but under abnormal growing conditions may be as low as 10 or as high as 15. The Brix of the final product will usually be about 40–43 for beverage purposes, but may be substantially higher, and for other purposes may be 60–65 or even higher. For example, assume for convenience that a batch of fresh juice has a Brix value of 10 and is thus composed mainly of 10 parts soluble solids (mostly sugars) and 90 parts water. Assuming no loss of sugars, 75 parts of water must then be removed to provide a final concentrate of 40 Brix composed of the original 10 parts of soluble solids and the remaining 15 of the original 90 parts of water. Thus the centrifuged concentrate must not contain more than the aforesaid 15 parts of water, even though the evaporation stage be carried to dryness. It will be seen that the maximum water content of the centrifuged concentrate is a function of two factors, namely, the degree of concentration desired in the final product and the Brix of the fresh juice. If the fresh juice is 15 Brix, the centrifuged concentrate must not contain more than 22.5 of the original 85 parts of water, for the same final Brix of 40. If the Brix of the final product is to be higher, say 60 Brix, then for fresh juice of 12 Brix the centrifuged concentrate must not contain more than 8 of the original 88 parts of water, etc.

The foregoing maximum amounts of water in the centrifuged concentrate are permissible if the liquor from the residue ice is evaporated to dryness and only the solids are returned to the concentrate. In practice, however, it is preferable as a rule to concentrate the liquor only partially so that the evaporated product is still liquid and can be handled conveniently. In such cases the amount of water remaining in the evaporated concentrate must be taken into account and the amount of water in the centrifuged concentrate must be correspondingly limited to less than the aforesaid maxima. Referring to the above illustrations, for example, if the evaporated concentrate contains three of the original 90 parts of water, the centrifuged concentrate must not contain more than 12 of the original 90 parts if a final Brix of 40 is to be obtained.

On the other hand, the efficiency of the centrifuging operation with respect to sugar recovery is not a controlling factor, since the volatile flavor constituents are separated from the ice with the first discharge from the centrifuge, and since sugars or other soluble solids retained in the ice at low efficiencies are recovered in the evaporated concentrate and find their way into the final product.

Subject to the above limitations, the freezing concentration stage of the process may vary widely. For example, the Brix of the centrifuged concentrate may be anywhere from about 20 to 40 or 50. Rapid freezing in cakes or in the form of flake ice tends to produce a mass of fine ice crystals from which the concentrate can be separated only with difficulty. The result is that at low final temperatures of freezing the Brix of the centrifuged concentrate may run as high as 40–50 but the volume recovered is small and large amounts of solids are occluded in the ice. Slower freezing of the juice in cakes, followed by comminution of the ice into small pieces before centrifuging, facilitates separation of the concentrate, but if the freezing temperature is low enough the results will be similar to those obtained with rapid freezing as mentioned above. Due to the relatively high Brix and small volume of the concentrate in such cases, the amount of water that it contains is small and seldom exceeds that permissible in the final product. Such procedures are desirable in case the Brix of the final product is to be greater than the usual 40–43 range, say 50–55, which is higher than is usually desired for beverage purposes but can be used for these purposes or to provide a sherbet base or the like.

For a product of 40–43 Brix, it is usually preferable not to freeze the ice so hard or so rapidly and to produce a centrifuged concentrate of about 25–35 Brix. In such cases it may be necessary, however, to terminate the run of the centrifuge before maximum separation has been effected, in order to keep the amount of water in the concentrate below the permissible maximum. For example, if the juice is frozen slowly into cakes at a final temperature of around 23° F., broken into small pieces, and centrifuged until the discharge is practically complete, a concentrate of around 30 Brix can be obtained with 85–90% efficiency in terms of recovery of soluble solids. However, the water content of this concentrate may be too great to permit obtaining 40 Brix in the final product, even if the solids occluded in the ice were to be evaporated to dryness. In such cases the run of the centrifuge may be cut short to decrease the volume of concentrate and consequently its water content. As explained above, the permissible water content depends mainly on the Brix of the fresh juice and the Brix desired in the final product, and it is not affected by variations in the Brix of the centrifuged concentrate. With still higher freezing temperatures, concentrates as low as 20 Brix may be obtained, but the amount discharged from the centrifuge is subject to the same limitations as to water content and the centrifuge run should be controlled accordingly. Although more soluble solids are retained in the ice with shortened centrifuge runs, this is not objectionable since the volatile flavor constituents are separated from the ice in the initial stages of the run and the solids remaining in the ice are not lost but are recovered during the evaporation stage without loss of or damage to volatile flavor.

The recovery of soluble solids from the centrifuge ice may take place in various ways. The entire volume of ice may be melted, either in the centrifuge or elsewhere, and passed to the evaporating apparatus. In many cases, however, it will be preferable to thaw the ice only partially so as to release most of the soluble solids, the remaining ice being discarded. This procedure has the advantage of decreasing the evaporation load, which may be of greater importance from the economic standpoint than the loss of a few per cent of solids. Such partial thawing may be effected in any suitable manner, as for example by heating the ice in the centrifuge by means of steam, hot air or gas, infra-red heaters, induction heating, etc. The ice may also be washed with fresh juice, or even with water.

Various known types of evaporating equipment can be used to concentrate the residue as explained above. Since the juice constituents subjected to evaporation are only slightly heat-labile, if at all, the evaporation procedure used may vary greatly. Preferably, however, the evaporation should be carried out under vacuum at relatively low temperatures, say 40-50° F., although very satisfactory results can be obtained at higher temperatures such as 70° F. The degree of concentration effected in the evaporator is correlated with the centrifuging operation so that the combined amounts of water do not exceed that permissible in the final product. Depending on the Brix of the fresh juice, the Brix desired in the final product, and the degree of concentration effected by freezing (i. e., the Brix of the centrifuged concentrate), the Brix of the evaporated residue may be as high as 80 in some cases and as low as 50 in others. For a final product having a Brix of 40-43 and a centrifuged concentrate of 25-35 Brix, the centrifuge run may be regulated so that the Brix of the evaporated residue falls in the range of 55-75 with good results.

It will be evident from the foregoing description that the process is well adapted for continuity of operation if desired. The fresh juice can be frozen in cakes and then broken up and fed to the centrifuging operation, or if desired the juice can be slush-frozen in a continuous freezer of any suitable type which precedes the centrifuge. Any suitable known type of continuous centrifuge can be employed, the initial discharge from the ice being separated to provide the desired amount of centrifuged concentrate. The final discharge, preferaby increased by washing and for partial thawing of the ice, can then be passed directly to the evaporating equipment and the remaining ice discarded or used to provide refrigeration for the juice-freezing operation.

The process can be controlled simply and easily and with a high degree of accuracy. The Brix desired in the final product determines the proportion of water to soluble solids therein; at 40 Brix this proportion is 3:2. Knowing the Brix of the fresh juice, and the loss of solids (if any) in the process, the amount of solids in final product can be determined; for example, assuming 95% recovery of solids from fresh juice at 12 Brix, the solids in the final product will amount to 11.4% of the fresh juice. Since the proportion of water to soluble solids is 3:2, the desired water content of the final product is 17.1% of the fresh juice. For every 100 lbs. of fresh juice, the final product should contain 11.4 lbs. soluble solids and 17.1 lbs. water.

If the centrifuged concentrate is at 30 Brix, therefore, the run may suitably be limited to produce an amount of concentrate equal to about 20% of the fresh juice, including solids equal to 6% of the fresh juice and water equal to 14% of the fresh juice. The solids content of the liquor comprising the remaining unseparated concentrate plus thawed ice will be 5.4% of the fresh juice, and this liquor is evaporated until its water content is reduced to 3.1% of the fresh juice or to 63.5 Brix. In other words, for every 100 lbs. of fresh juice the centrifuged product contains 6 lbs. solids and 14 lbs. water and the evaporated concentrate contains 5.4 lbs. solids and 3.1 lbs. water, the two fractions making up a final product containing 11.4 lbs. solids and 17.1 lbs. water (=40 Brix). If evaporation is carried to 75 Brix, the evaporated concentrate will contain the same 5.4 lbs. solids but only 1.8 lbs. water and the Brix of the final product will be about 42.

In the above example, although the run of the centrifuge is limited, the amount of concentrate produced is nevertheless substantially more than half of the total amount that would be obtained if centrifuging were continued to completion. Since as stated above, the volatile flavor constituents of the fresh juice are concentrated in the early fractions of the discharge from the centrifuge, most of the volatile flavor is separated from the ice and thus is not subjected to evaporation. Even when the run of the centrifuge is limited to produce an amount of concentrate equal to only 17% of the fresh juice, and the remaining liquor is evaporated only to about 55 Brix, the final product at about 40 Brix still contains the major proportion of the volatile flavor constituents of the fresh juice.

Should it be desired to produce a concentrate of higher Brix for any purpose, say a 60 Brix concentrate for use as a sherbet base, it will usually be desirable to regulate freezing and centrifuging conditions so as to produce a centrifuged concentrate having a substantially higher Brix value than in the foregoing illustration. For example, using the same 100 lbs. of 12 Brix juice and again assuming 95% recovery of soluble solids, the soluble solids content of the final product will be 11.4 lbs. and its water content at 60 Brix will be 7.6 lbs. If the centrifuged concentrate is produced at 50 Brix, it may for example amount to 12 lbs., including 6 lbs. soluble solids and 6 lbs. water. The remaining liquor should then be evaporated to about 77 Brix so as to comprise 5.4 lbs. of soluble solids and 1.6 lbs. water.

The illustrations set forth above will vary somewhat with variations in the Brix of the starting juice, which may sometimes run substantially higher than 12 Brix. For instance, starting with 100 lbs. of 15 Brix juice and again assuming 95% recovery of soluble solids, the total soluble solids in the final product will be 14.25 lbs. If the Brix of the final product is to be 40, the final product should then contain about 21 lbs. water. If the centrifuged concentrate is at 30 Brix, and the run is limited to 20% of the original juice as in the first example given above, then the liquor to be evaporated will contain 7 lbs. of soluble solids and will need to be evaporated only to about 55 Brix to obtain the desired final product. In such a case the run of the centrifuge may be prolonged to increase the yield of centrifuged concentrate say to 24-25% in which event the liquor will need to be evaporated to a Brix value of about 63-64.

In the case of such high Brix juices, moreover, it may be advantageous to produce low Brix centrifuged concentrates. For example, if the centrifuged concentrate of the preceding example is at 20 Brix instead of 30 and the run is limited to about 19-20% of the original juice, the remaining liquor can be evaporated to about 72-78 Brix and blended with the centrifuged concentrate to produce a product around 43 Brix. If the remaining liquor is evaporated only to about 65 Brix, the Brix of the final product will be about 40 instead of 43.

The foregoing examples serve to illustrate the variations which are possible in practicing the process of the present invention. It will be understood, however, that these examples are for purposes of illustration only and that the invention is not restricted thereto as the operating conditions of the process will depend on the Brix of the fresh juice and the Brix of the desired final product and also on the Brix and amount of the centrifuged concentrate that may be preferred in any given case. Accordingly reference should be had to the appended claims for a definition of the limits of the invention.

What is claimed is:

1. A process of concentrating orange juice to a final product of the predetermined desired Brix value and substantially without loss or impairment of its volatile flavor constituents and soluble solids which comprises partially freezing the juice and separating from the ice a concentrate having a Brix value of 20 to 50, the amount of said concentrate separated from the ice being limited so that its water content does not exceed that of the desired final product, separating the remaining soluble solids and liquor from the ice and evaporating the liquor until the combined water content of the evaporated residue and of said concentrate does not exceed the water content of the desired final product, and then adding said evaporated residue to said concentrate to make said final product.

2. A process of concentrating orange juice to a final product of predetermined desired Brix value and substantially without loss or impairment of its volatile flavor constituents and soluble solids which comprises partially freezing the juice and separating from the ice a concentrate having a Brix value of 20 to 50, the amount of said concentrate being restricted so that its water content is less than that of the desired final product, separating the remaining soluble solids and liquor from the ice and evaporating the liquor until the water content of the evaporated residue plus that of said concentrate equals the water content desired in the final product, and then adding said evaporated residue to said concentrate.

3. A process of concentrating orange juice to a final product of predetermined desired Brix value and substantially without loss or impairment of its volatile flavor constituents and soluble solids which comprises partially freezing the juice and separating from the ice a concentrate having a Brix value of 20 to 50, the amount of said concentrate being restricted so that its water content is less than that of the desired final product, separating the remaining soluble solids and liquor from the ice and evaporating the liquor to a Brix of 50–80, the degree of evaporation being correlated with the water content of said concentrate so that the combined water contents of the concentrate and evaporated residue equal that of the desired final product, and then adding said evaporated residue to said concentrate.

4. A process of concentrating orange juice to about 40–43 Brix substantially without loss or impairment of its volatile flavor constituents and soluble solids which comprises partially freezing the juice and separating from the ice a concentrate having a Brix value of 25 to 35, the amount of said concentrate being restricted so that its water content is less than that of the desired final product, separating the remaining soluble solids and liquor from the ice and evaporating the resulting liquor until the water content of the evaporated residue plus that of said concentrate equals that desired in the final product, and then adding said evaporated residue to said concentrate.

5. A process of concentrating orange juice to about 40–43 Brix substantially without loss or impairment of its volatile flavor constituents and soluble solids which comprises partially freezing the juice and separating from the ice a concentrate having a Brix value of 25–35, the amount of said concentrate being restricted so that its water content is less than that of the desired final product, separating the remaining soluble solids and liquor from the ice and evaporating the liquor to a Brix of 55–57, the degree of evaporation being correlated with the water content of said concentrate so that the combined water contents of said concentrate and the evaporated residue equal that of the desired final product, and then adding said evaporated residue to said concentrate.

6. A process of concentrating orange juice to a final product of predetermined desired Brix value and substantially without loss or impairment of its volatile flavor constituents and soluble solids which comprises partially freezing and centrifuging the juice, the freezing temperature and extent of centrifuging being such as to provide a concentrate having a Brix value of 20 to 50 and containing an amount of water less than that of the desired final product, thawing the remaining ice at least partially to release occluded soluble solids and evaporating the resulting liquor until the water content of the evaporated residue plus that of said concentrate equals the water content desired in the final product, and adding said evaporated residue to said concentrate.

7. A process of concentrating orange juice to a final product of predetermined desired Brix value which comprises partially freezing and centrifuging the juice, the freezing temperature and extent of centrifuging being such as to provide a concentrate having a Brix value of 20–50 and containing an amount of water less than that of the desired final product, thawing the remaining ice at least partially to release occluded soluble solids and evaporating the resulting liquor under vacuum to a Brix of 50–80, the degree of evaporation being correlated with the water content of said concentrate so that the combined water contents of the concentrate and evaporated residue equal that of the desired final product, and then combining said concentrate and residue.

8. A process of concentrating orange juice to about 40–43 Brix which comprises partially freezing and centrifuging the juice, the freezing temperature and extent of centrifuging being such as to provide a concentrate of 25–35 Brix and containing an amount of water less than that desired in the final product, thawing the remaining ice at least partially to release occluded soluble solids and evaporating the resulting liquor until the water content of the evaporated residue plus that of said concentrate equals that desired in the final product, and then combining said concentrate and residue.

9. A process of concentrating orange juice to about 40–43 Brix which comprises partially freezing and centrifuging the juice, the freezing temperature and extent of centrifuging being such as to provide a concentrate of 25–35 Brix and containing an amount of water less than that desired in the final product, thawing the remaining ice at least partially to release occluded soluble solids and evaporating the resulting liquor under vacuum to a Brix of 55-75, the degree of evaporation being correlated with the water content of said concentrate so that the combined water contents of the concentrate and residue equal that of the resired final product, and then combining said concentrate and residue.

GEORGE SPERTI.

REFERENCES CITED

The following references are of record in the file of this patent:

UNITED STATES PATENTS

| Number | Name | Date |
|---|---|---|
| 1,379,470 | Monti | May 24, 1921 |
| 2,354,633 | Bedford | July 25, 1944 |